Feb. 16, 1971   M. F. SMITH ET AL   3,563,036
INFLATABLE FLOATING BOOMS
Filed Sept. 2, 1969   3 Sheets-Sheet 3
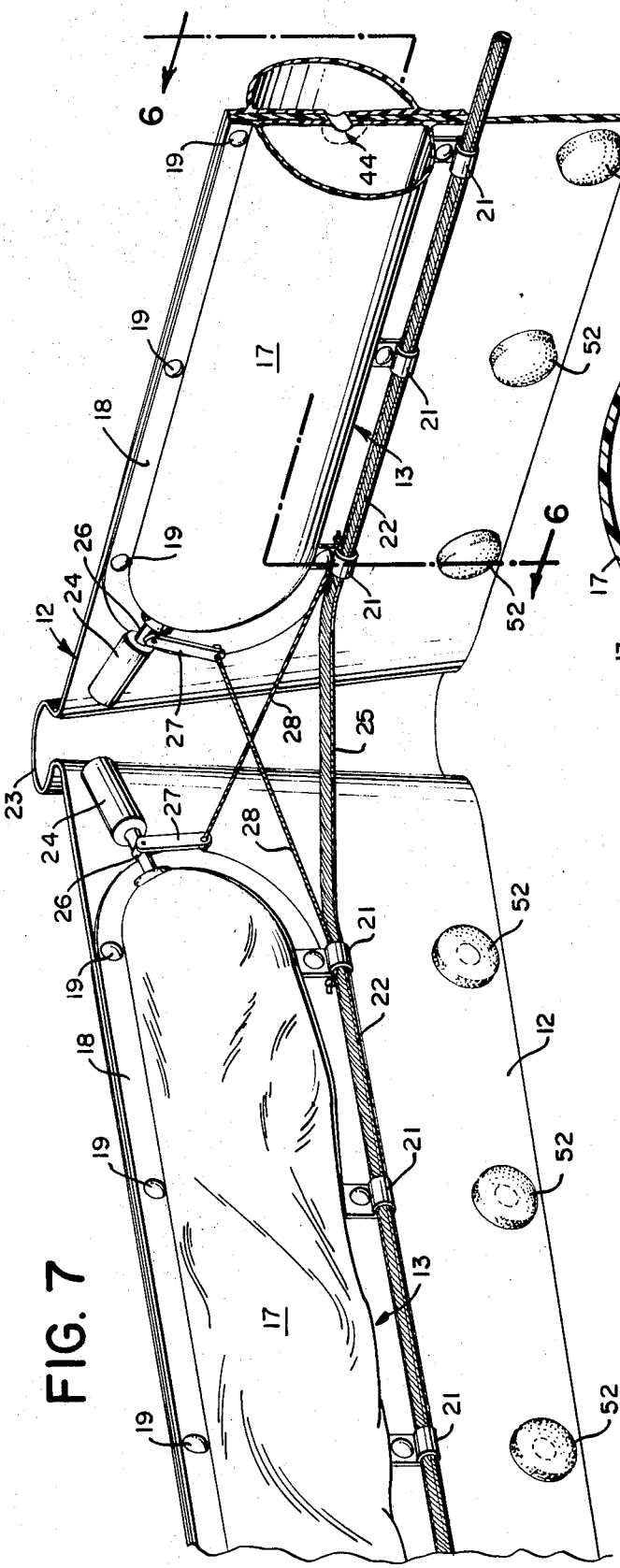
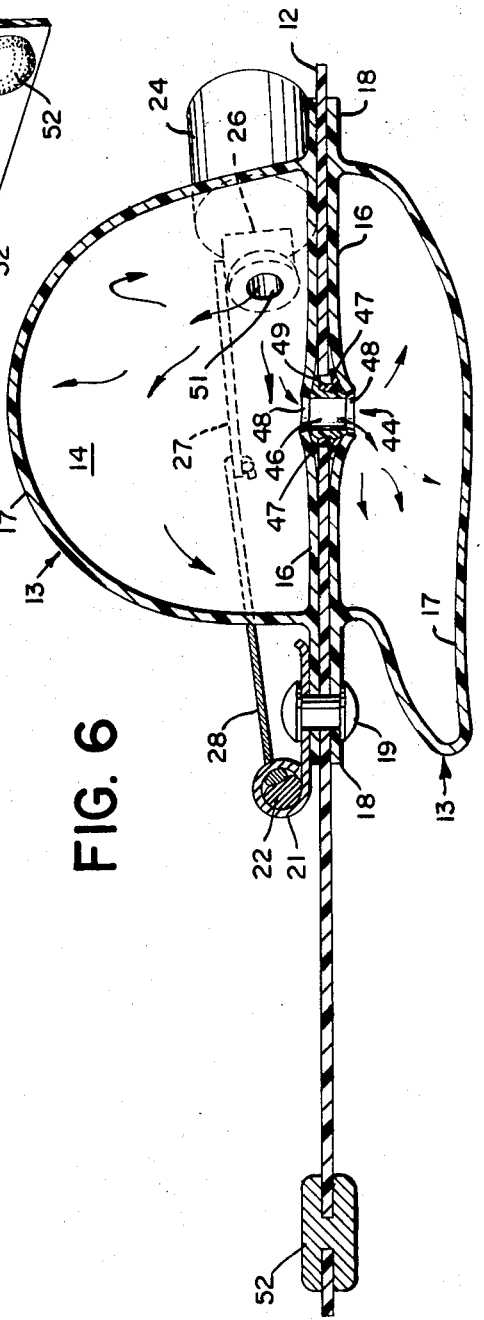
FIG. 6
FIG. 7

United States Patent Office 3,563,036
Patented Feb. 16, 1971

3,563,036
INFLATABLE FLOATING BOOMS
Millard F. Smith, Westport, Conn. (P.O. Box 295, Saugatuck, Conn. 06882) and Russell M. Blair, Westport, Conn.; said Blair assignor to said Smith
Filed Sept. 2, 1969, Ser. No. 854,626
Int. Cl. E02b *3/04, 15/04*
U.S. Cl. 61—1       9 Claims

ABSTRACT OF THE DISCLOSURE

Accordion-folding floating booms for confining spilled oil or other floating material incorporating a thin continuous flexible fin positioned vertically and provided with numerous, short, inflatable balloon-like float pockets mounted along its upper edge. The float pockets are all deflatable and collapsible for compact accordion-folded stowage of the boom in limited volumes of space for storage, shipment and delivery to the site by water transport or by airdrop. Automatic inflation of successive inflatable float pockets upon unfolding deployment of the booms is achieved by individual pressure sources actuated by the deployment process, providing inflation pressure to produce fully inflated expansion of the float pockets for buoyant floatation of the boom structure. Compressed gas charge cylinders triggered by unfolding of the boom supply the desired inflation pressure. Alternatively, chemical reactants enclosed in adjacent enclosures are mixed together upon unfolding deployment of the boom to produce sufficient amounts of gaseous reaction product to provide inflation pressures required for each buoyant balloon-like float pocket.

---

This invention relates to accordion-folding floating booms for confining floating material such as spilled oil, and particularly to quickly deployable booms which may be stored compactly folded in small cargo volumes and which may be deployed quickly and easily by unfolding and inflating to place them into operating condition surrounding spilled oil or other floating material to be confined.

BACKGROUND OF THE INVENTION

Many different forms of floating boom structures have been proposed from time to time for the containment of floating materials such as spilled oil. Most of these conventional boom devices incorporate heavy bulky floats of cork, wood or other voluminous materials, making storage and deployment of such conventional booms awkward and time consuming. The accordion-folding lightweight polymer booms described in U.S. Pats. 3,146,598, 3,499,290 and in pending U.S. patent applications S.N. 815,663 and 852,776, assigned to co-applicant Smith, offer significant advantages over these awkward, bulky, conventional booms in providing accordion folding capability derived from longitudinal spacing of individual buoyant floats arrayed along the upper edge of a continuous vertically positioned thin flexible fin, offering spaces between adjacent floats at which the boom structure may be folded back upon itself in accordion fashion for compact storage.

For example, a storage container 4′ x 4′ x 10′ offering 160 cubic feet of cargo space provides ample room for stowing 500 feet of such an accordion-folded polymer boom incorporating 6-inch diameter floats, or a 360-foot length of a similar accordion-folded polymer boom having 8-inch diameter floats, or a 200-foot length of a similar accordion-folded polymer boom with 10-inch diameter floats.

In order to provide compactly-foldable booms in lengths suitable for surrounding and confining the entire area of of a body of spilled oil floating on the water of an anchorage or harbor, cargo storage volume must be provided for a boom considerably longer than 500 feet in length. 3000-foot booms and 5000-foot booms have been used on many occasions where sudden and serious oil spills have resulted from oil tanker collisions and groundings or from ruptured fuel hoses at refinery docks. Accordingly, a great unfilled need exists for a foldable floating boom of length greatly exceeding 500 feet which may be folded with extreme compactness into small cargo storage volume.

Inflatable floating booms having collapsed cylindrical upper portions which may be filled by pressurized foam material or gas from such means as a $CO_2$ cartridge have been proposed in U.S. Pats. 2,682,151 and 2,968,928, but such elongated, continuous, inflatable floatation cavities as those proposed in these two United States patents result in booms which are extremely awkward to store and to deploy with convenience, speed and effectiveness. For these reasons they have failed to fill the need for a compactly foldable and quickly deployable floating boom.

SUMMARY OF THE INVENTION

The novel accordion-folding booms of the present invention fill this need with great effectiveness by combining an elongated thin flexible fin with a longitudinally spaced apart plurality of individually inflatable buoyant floatation pockets. In their deflated condition, these pockets lie flat against the fin and only the modest bulk of ballast weights, reinforcing cables and pressurized floatation cylinders or compartmented containers of gas-producing chemical reactants protrude laterally from the fin and deflated pocket assembly.

Automatic, self-actuating inflation devices are preferably employed to inflate the individual floatation pockets successively during the boom deployment operation, providing quick, convenient conversion of the device from a flat-folded compactly-stored boom into a fully-inflated, unfolded, elongated, buoyant structure, with the conversion operation occurring progressively along the length of the boom as it is being deployed directly from storage.

Accordingly a principal object of the present invention is to provide accordion-folded floating booms compactly foldable into unusually small storage volumes and progressively convertible into buoyant, expanded, floating structures as each folded boom is unfolding from its storage container for deployment.

Another object of the invention is to provide compactly-foldable floating booms incorporating longitudinally-spaced, separate, inflatable buoyancy pockets independently buoyant to provide multiple, numerous sub-divided buoyant forces for floatation of the overall structure at a large multiplicity of points longitudinally arrayed along its length.

A further object of the invention is to provide compactly-foldable floating booms incorporating automatic, self-actuating inflation means cooperating with independently-inflatable buoyancy pockets longitudinally spaced apart along its length.

Other and more specific objects will be apparent from the features, elements, combinations and operating procedures disclosed in the following detailed description and shown in the drawings.

THE DRAWINGS

FIG. 5 is a greatly enlarged fragmentary perspective view showing an alternative inflation mechanism employing a compressed gas cylinder;

FIG. 6 is a greatly enlarged cross-sectional end elevation view of the alternative embodiment shown in FIG. 5, also showing an inflation passage through the central fin between adjacent floatation pockets; and FIG. 7 is a fragmentary perspective view of the floating boom shown in FIGS. 5 and 6, illustrated in the process of conversion into its fully inflated deployed condition.

COMPACTLY FOLDED STORAGE

Figure 1:
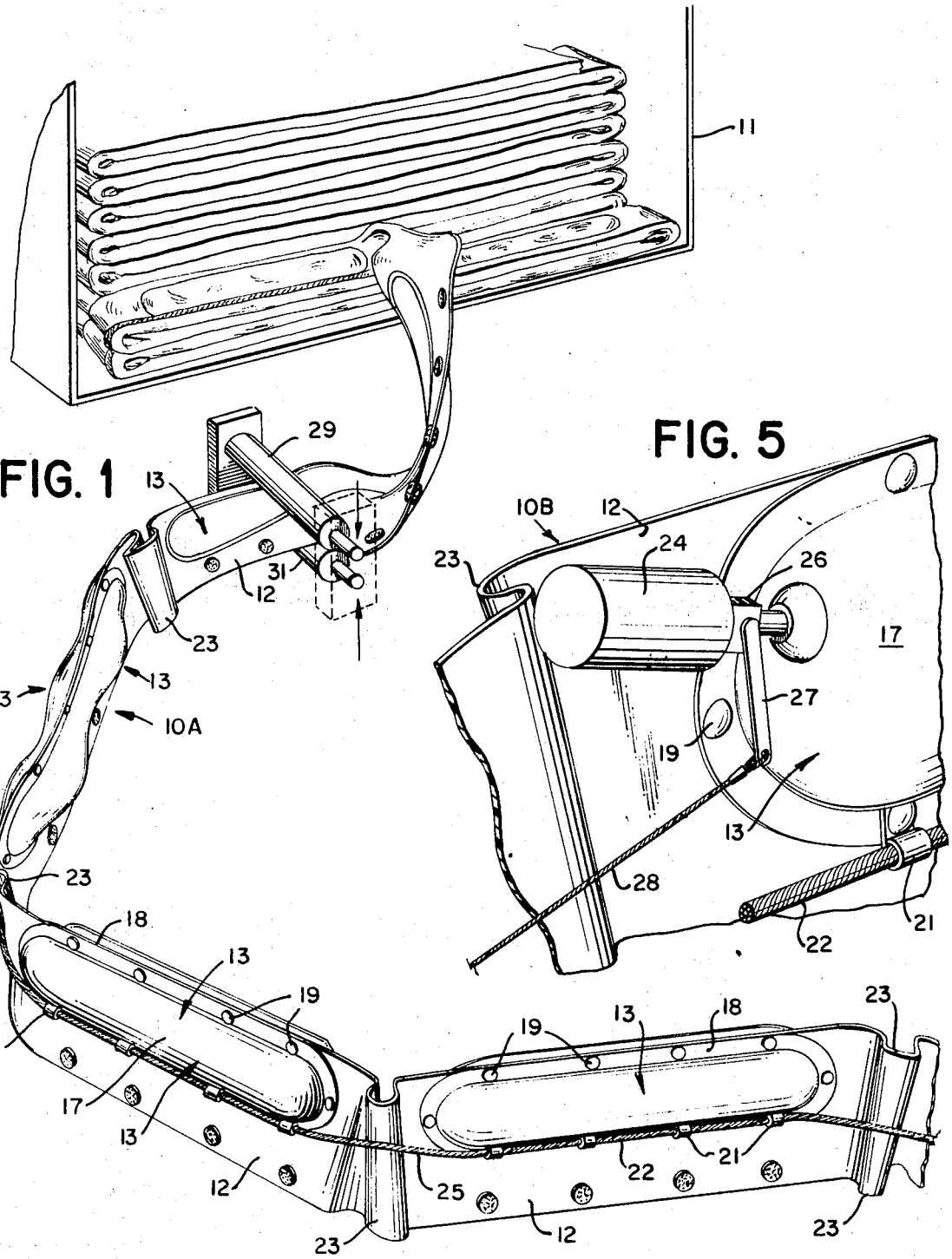
FIG. 1 is a schematic perspective view of a folded oil boom embodying the present invention shown in the process of being converted from its compactly folded state into a fully inflated and deployed floating boom.

As shown in FIGS. 1 and 7 the floating booms 10A and 10B of the present invention are adapted to be accordion-folded in tight, compact, stacked layers. The boom 10A shown tightly-folded and packed in rows and layers within the storage container 11 in FIG. 1 comprises a continuous longitudinal fin 12 which is deployed in a generally vertical or "on-edge" position, as shown at the lower end of FIG. 1.

A series of inflatable floatation pockets 13 are positioned along the upper edge of fin 12. As illustrated in FIGS. 1, 6 and 7, the pockets 13 are formed with hollow inflatable cavities 14 enclosed between a substantially flat inner wall 16 and a flexible, convexly-protruding wall 17. The walls 16 and 17 are integrally joined along their peripheral edges around the pocket 13 to enclose the internal cavity 14 therein, and a flange 18 forming a continuation of the substantially flat inner wall 16 extends outward around the periphery of the walls to form a securing flange adjacent to fin 12.

The pockets 13 may be formed in any suitable shape. As indicated in FIGS. 2, 3, 4 and 6, the preferred form of pocket 13 comprises an elongated, round-ended semi-cylindrical shape, whose flat inner wall 16 may be juxtaposed with the inner wall 16 of the adjacent pocket 13 on the opposite side of fin 12, sandwiching the fin 12 between the two inner walls 16 so that the adjacent semi-cylindrical pockets 13 together form a cylindrical floatation structure extending along the upper edge of fin 12.

When inflated, as shown at the lower end of FIG. 1, these "back-to-back" semi-cylindrical floatation pockets somewhat resemble a row of inflated sausages surmounting fin 12 along its upper edge. As shown in the figures, the flanges 18 of all of these pockets 13 may be joined to fin 12 by such means as rivets formed of molded polymers, of stainless steel or of other suitable materials compatible with exposure to salt water. Alternatively, the flanges 18 may be cemented, heat-sealed or otherwise anchored to the supporting fin 12.

A high-strength, tension-bearing cable 22, preferably formed of stainless steel, is anchored to the assembled boom directly beneath the lower portions of the pockets 13. Cable 22 is preferably secured by swaged clamping clips 21 formed of flat metal bar stock, preferably stainless steel, and each having an apertured upper end held in position by one of the rivets 19 and a curled lower end encircling the tension cable 22 in tightly swaged supporting relationship. The upper marginal portion of the clip 21 is preferably bent outwardly to provide an outwardly inclined flange disposed beneath the cable 22 and the float 13 in the assembled boom structure. The clip and flange is provided with rounded ends and edges to avoid marring or damage to the adjacent polymer boom components. As shown in the drawings, and particularly in the perspective view of FIG. 1, the segment 25 of reinforcing cable 22 spanning the space between the facing ends of two adjacent boom pockets 13 is preferably dimensioned to have a length slightly less than the overall width or diameter of the buoyant pockets 13. Thus, as indicated in FIGS. 1 and 7, the fin 12 is provided with slight excess length 23 between the facing ends of each of the adjacent pairs of floatation pockets 13 as compared with the inter-float length 25 of reinforcing cable 22 spanning the longitudinal distance between the facing ends of adjacent pairs of floats. Accordingly, the excess length 23 of fin 12 is normally slightly buckled or arched to permit free folding and flexing of the assembled and inflated boom. Flexing from side to side in a lateral plane is greatly facilitated by this excess length 23. Flexing in a vertical plane is also greatly facilitated by the excess length 23 of fin 12 between each pair of floatation pockets 13, permitting the deployed boom to conform closely to the troughs and crests of advancing waves.

The greatly enlarged cross-sectional elevation view of FIG. 6 illustrates the manner in which the inner walls 16 of floatation pockets 13 and their outwardly-extending flanges 18 are juxtaposed in "back-to-back" relationship, sandwiching between themselves the upper portion of the fin 12, with their respective flanges 18 being secured by rivets 19, which also anchor the clips 21 along the middle portion of fin 12, supporting the reinforcing cable 22 anchored therein.

INFLATION TECHNIQUES

The inflating deployment of the booms of this invention is preferably performed as a single automatic operation while the tightly compact accordion folded boom is being drawn from its storage container 11. Two different inflation techniques are illustrated in the drawings. With the boom 10B of FIGS. 5–7, compresesd air, compressed nitrogen or other suitable compressed gas is stored in individual pressure cylinders 24 which are connected by way of an inflation valve 26 having an actuating arm 27 to the interior of the cavity 14 of one of the pockets 13 in each juxtaposed pair of floatation pockets. Compressed nitrogen is particularly preferred because of its chemically inert character and because its relatively large molecules diffuse slowly through the walls of pockets 13 when these pockets are fabricated of preferred thin sheet plastic materials, such as ethyl vinyl acetate. Conventional inflation cylinders, customarily used to inflate emergency rafts, life vests and the like, utilize carbon dioxide which diffuses rapidly through such pocket materials. Therefore the floatation pockets 13 lose their buoyancy more quickly when $CO_2$ is employed than when compressed nitrogen is used as the inflating gas.

As illustrated in FIGS. 5, 6 and 7, the actuating arm 27 is preferably connected to a lanyard 28 formed of elastic shockcord material whose opposite end is firmly gripped in the first clip 21 of the next adjacent pocket 13. It should be noted that cylinder 24 and its lanyard 28 are respectively secured to different adjoining pockets 13, and these should be pockets 13 which are brought into closely juxtaposed relationship when the boom 10B is folded accordion-fashion at the excess fin length 23 spanning the space between these adjacent pockets 13. Accordingly, the lanyard 28 is provided with a length stretching it taut as the boom 10 is unfolded. In the folded position of the boom 10B the lanyards 28 are closely drapped between the actuating arms 27 and their anchoring clips 21 at their opposite ends, leaving the valves 26 deactivated. Unfolding of the boom 10 moves the two pockets 13 apart pivotally about the pivot zone provided by the excess length 23, stretching lanyards 28 taut and causing them to apply torque to actuating arms 27, pivoting these arms to operate each valve 26, switching it from its closed to its open condition and admitting compressed gas from containers 24 into the cavities 14 of the floatation pockets 13. After use, containers 24 may be refilled or replaced and valves 26 rearmed during folding storage for the next deployment of boom 10B.

An alternative inflation technique is illustrated in FIGS. 1–4, comprising a similar embodiment 10A of the boom suitable for a single emergency use and subsequent disposal. Boom 10A is provided with flexible and rupturable-partition containers secured inside the pockets 13. As illustrated in the enlarged, cross-sectional schematic successive views of FIGS. 2, 3 and 4, these partition containers serve to segregate chemical reactants in separate compartments until the entire boom 10A is moved lengthwise through a pair of pinch rolls 29 and 31 resiliently biased together to impose a squeezing force directly upon the structure of boom 10A. The approaching arrows in FIGS. 1, 2, 3 and 4 show the resilient forces acting upon one or both ends of the rotatable axial shafts of rolls 29 and 31 in approaching directions. These forces may be supplied by helical coil compression springs, mounted as shown in FIGS. 6, 7, 12 and 12A of Weymouth Patent 3,223,344. Relatively soft depressible springs will provide separating deflection of pinch rolls 29 and 31 to permit booms 10A to pass smoothly therebetween.

Figure 2:
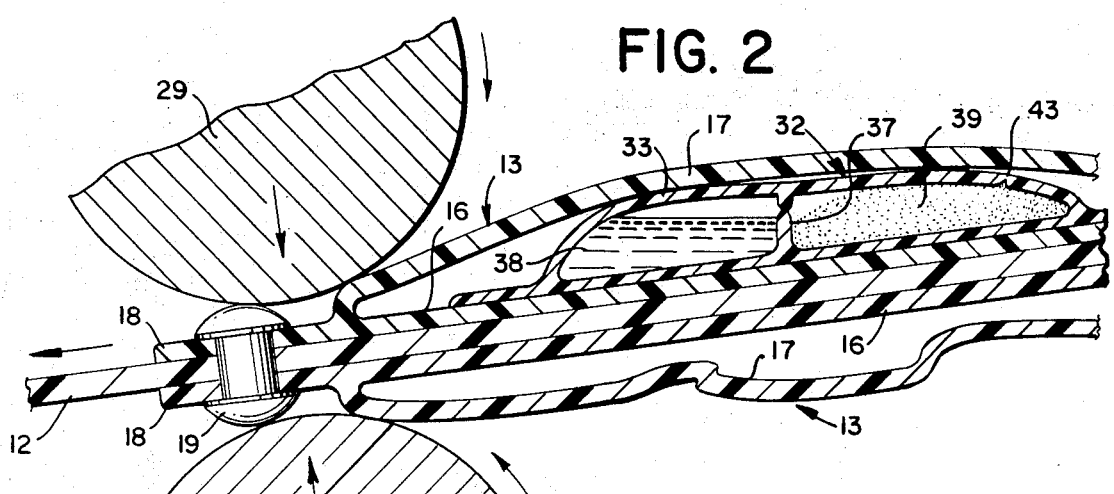
FIGS. 2, 3 and 4 are greatly enlarged fragmentary cross-sectional elevation views showing the pinch roll squeezing operation employed to achieve rupturing of the rupturable partition container employed to mix gas-producing reactants for pressurizing and inflating the floatation pockets in the boom of FIG. 1.
Figure 3:
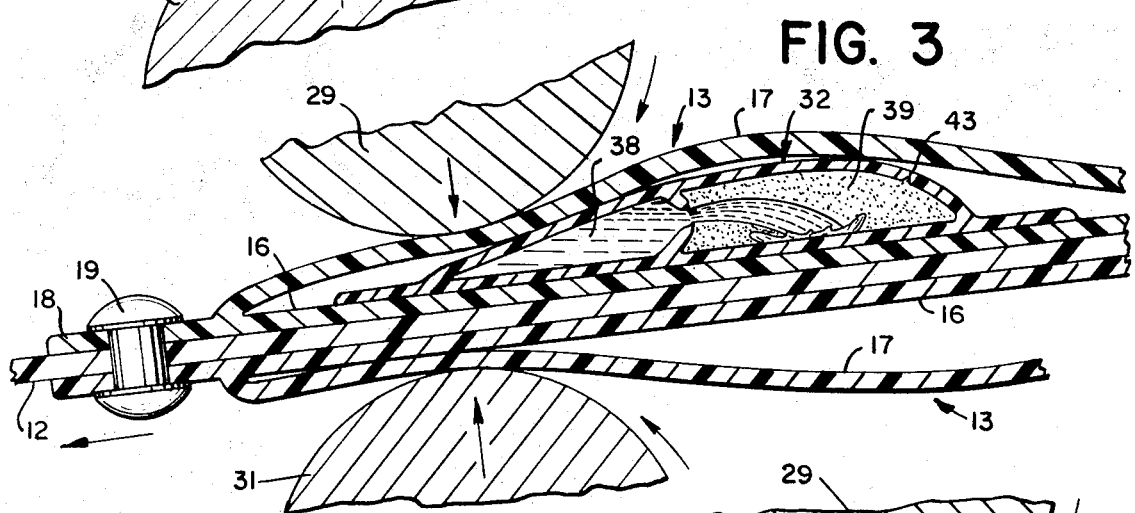

In FIG. 2, the two adjacent pockets 13 are shown in their deflated condition with their outer walls 17 flexibly arrayed close to their inner walls 16. A smaller, flexible two-part reactant storage container 32 is cemented or otherwise mounted on the inner face of inner wall 16 within cavity 14. Container 32 comprises a flexible outer wall 33 and a substantially flat inner wall 34, joined around their common periphery and provided with a cementing flange 36 by which they are secured to the inner wall 16 of the pockets 13 within which they are enclosed.

A central, rupturable partition 37 forms a temporary wall separating the interior portion of the storage container 32 to form separate cavities, a liquid cavity 38 and a powder cavity 39. As indicated in FIG. 2, the end of pocket 32 forming liquid cavity 38 is positioned at the "down-stream" end of the pocket 32, preferably in a position where it will be exposed to the squeezing force of the pinch rolls 29 and 31 before the powder cavity 39 is exposed to the same squeezing force.

Liquid cavity 38 and powder cavity 39 are respectively filled substantially full of chemical reactants which are independently inactive, but which react when they are brought together to create a large volume of gas for the purpose of inflating pocket 13. The solid reactant in powdered form in cavity 39 may be $NaHCO_3$, $(NH_4)_2CO_3$ or $LiSO_4$ or a mixture of two or more of these materials. The liquid reactant in cavity 38 is preferably acetic acid, $(COOH)CH_2COH(COOH)CH_2COOH$ with water added to produce the desired concentration and to enhance the intermixing of the reactants after rupture of partition 37.

Figure 4:
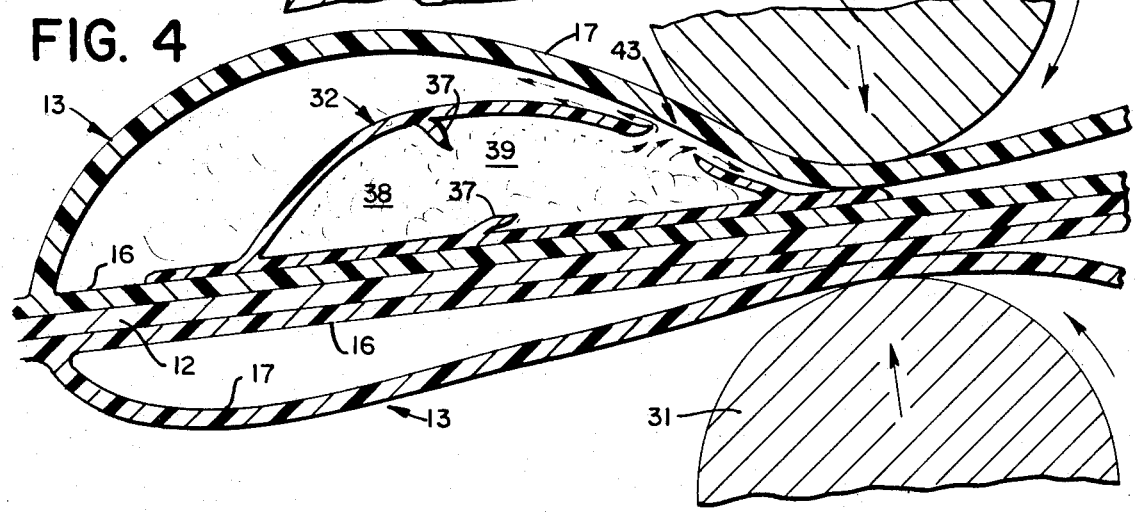

As the liquid cavity 38 is passed through the pinch rolls 29–31, the relatively incompressible liquid therein causes the rupturable partition 37 to burst, permitting the liquid 41 to mix with the powder 42 in powder cavity 39. As a result, as shown in FIG. 4, a large volume of gas is generated in the powder cavity 39 and the outer walls 33 of storage container 32 is provided with a weakened rupture line or zone 43 at a point where outer wall 33 encloses the powder cavity 39, permitting the gas generated by the chemical reaction in powder cavity 39 to be released after this segment of the endwise moving boom has travelled longitudinally through pinch rolls 29–31. The gas resulting from the chemical reaction ruptures outer wall 33 at the rupture zone 43, permitting the gas to expand the inflatable floatation pocket 13 within which the storage container 32 is positioned. Accordingly, as the boom travels endwise from storage container 11 through pinch rolls 29–31 it is automatically self-inflated by the gas produced by this chemical reaction as it leaves the pinch rolls 29–31, automatically converting the flattened, collapsed, deflated boom from its compactly folded state into a fully inflated buoyant structure.

The same automatic conversion occurs in the pressure cylinder-lanyard embodiment of the boom 10B illustrated in FIGS. 5, 6 and 7. Thus, the automatic inflation of the deflated boom is produced either by the pinch roll operation, which may also provide tractive longitudinal force serving to withdraw the folded boom from its storage container 11 to propel it endwise towards its deployed position as indicated in FIG. 1, or by the unfolding operation itself, occurring as the boom is drawn from its flat folded condition toward its deployed position with its accordion folds opening to array the boom in its longitudinally extended position.

In the preferred forms of the present invention, each adjacent pair of pockets 13 positioned with their inner walls 16 juxtaposed sandwiching the fin 12 therebetween is inflated by the same volume of compressed gas supplying inflation pressure which is introduced and connected to inflate one of the pockets 13 first. A grommet-like connector conduit 44 shown in FIG. 7 and also in the enlarged cross-sectional end elevational view of FIG. 6 joins the two back-to-back pockets 13 at a central point therein, admitting the inflation pressure from the first pocket through fin 12 directly into the second pocket. Preferably, the conduit 44 is formed of two separate telescoping parts, the first being a hollow stem 46 protruding outwardly from the back face of inner wall 16 and having an annular securing flange 47 cemented encircling a connection aperture 48 formed in the inner wall 16. Stem 46 is telescopingly engaged within a mating protruding sleeve 49 extending outwardly from the adjacent inner wall 16 of the back-to-back pocket 13 and likewise having an annular securing flange 47 cemented around a connection aperture 48 formed in the inner wall 16 of this second adjacent pocket 13. The stem 46 and sleeve 49, telescoped in pressure-tight relationship, both extend through a suitable mating aperture in fin 12, thus providing a pressure tight connecting conduit 44 admitting inflation pressure from one pocket 13 into the adjacent pocket 13 on the opposite side of fin 12.

Accordingly, as shown in the pressurized cylinder embodiment 10B of the invention illustrated in the enlarged cross-sectional end elevation view of FIG. 6, when a pressurized gas is released from cylinder 24 by operation of valve 26 through the pivoting of actuating arm 27 drawn by the shockcord lanyard 28 upon the unfolding of the accordion folded boom 10B, the pressurized gas thereby released passes via valve 26 through the inflation port 51 into the interior cavity 14 of the first pocket 13 at the lefthand side of FIG. 6, filling the cavity 14 which expands to its fully distended, inflated condition shown at the lower end of FIG. 1. At the same time, the pressurized gas from inflation port 51 filling the lefthand cavity 14 also passes quickly through the connecting conduit 44 into the adjoining cavity 14 of the adjacent back-to-back pocket 13 shown at the righthand side of FIG. 6, likewise causing this pocket 13 to inflate to its expanded, buoyant condition almost simultaneously with the inflation of the mating lefthand pocket on the opposite side of fin 12.

AIRDROP CAPABILITY

The container 11 shown in FIG. 1 may be carried on shipboard near the side or stern of a vessel if desired. When a few unfolded segments of the floating boom are unfolded and deployed on the water surface behind the moving vessel, the drag force imposed upon them by the forward movement of the vessel may be employed to provide the tension utilized for the withdrawal of succeeding folded segments of the boom from their folded storage condition, either with or without the tractive driving force of resiliently biased pinch rolls 29 and 31 to aid in producing the longitudinal endwise movement of the boom.

If desired, storage container 11 may be carried in an aircraft which may itself be utilized for the delivery, release and deployment of the boom in its desired position. As the cargo aircraft circles the target area on the water surface, the folded boom its successively withdrawn unfolding from storage container 11 and descends endwise towards the surface of the water. The fin 12 is normally formed as a relatively stiff bendable sheet of neoprene-coated Dacron fabric or of polyethylene or similar sheet materials. Pockets 13 are preferably formed of neoprene-coated Dacron fabric or similar gas impervious materials. Being formed of flexible polymer materials, these unfolded booms are unharmed by impact on the water surface or by the drag force caused by sluicing relative movement of water past the boom if the rearward deployment velocity of the boom is not closely matched to the air speed of the cargo aircraft dispensing the boom. The unsupported weight of the descending boom itself may provide sufficient tension force to produce the unfolding withdrawal and longitudinal deploying descent of the boom from container 11 toward the target area.

The substantially cylindrical cross-sectional shape of the combined pairs of buoyancy pockets 13 sandwiching the upper edge of fin 12 minimizes "windage" and "leeway" or sidewise displacement of the deployed boom by crosswinds. The stiff depending fin 12 ballasted by ballast weights 52 along its lower edge thus extends downward below any floating material to be confined, and cannot be rolled up "window shade" fashion around pockets 13. The convex rounded ends of pockets 13 minimize longitudinal drag forces and facilitates the accordion-folding and lateral flexing of the inflated boom during its movement on the supporting water surface where it is deployed.

The various embodiments of this invention thus provide extremely compact, accordion-folded, deflated booms which may be stacked and stored in convient containers, and which are easily unfolded and deployed while simultaneously being converted from their collapsed, deflated condition to their inflated, buoyant operative condition. The advantages of high density folded storage are thus combined with the unique advantages of buoyant unfoldable floating booms having excellent lateral and vertical flexing capabilities, permitting them to conform closely to the troughs and crests of wave action on the supporting water surface.

Since the foregoing description and drawings are merely illustrative, the scope of the invention has been broadly stated herein and it should be liberally interpreted so as to obtain the benefit of all equivalents to which the invention is fairly entitled.

What is claimed is:

1. An accordion-foldable and collapsible boom assembly capable of conversion from a collapsed compactly folded stowed condition into an unfolded buoyant rigid segment deployed boom structure fully flexible at regions between adjoining segments, comprising
   (A) a continuous elongated flexible fin having upper and lower marginal edges,
   (B) a series of collapsible and inflatable buoyancy pockets formed of thin flexible sheet material, substantially impervious to diffusion of gas therethrough, secured in longitudinally spaced end-to-end relation along the upper marginal edge of the fin to form successive buoyancy segments thereof, with flexible inter-float segments of the fin extending between the adjacent ends of the pockets,
   (C) a continuous reinforcing cable extending along one side of the fin and anchored thereto adjacent the undersides of the series of pockets,
   (D) individual compressed gas inflation sources each operatively connected to an interior cavity of one of said collapsible and inflatable buoyancy pockets,
   (E) and means actuatable to cause each inflation source to release compressed gas into its cavity as each buoyancy segment is unfolded and withdrawn in its turn from its folded stowed condition into unfolded straightened condition,
whereby the buoyancy segments are successively rigidified by the inflation of their respective buoyancy pockets to form a flexibly segmented floating structure.

2. The boom assembly defined in claim 1, wherein each of said first inflatable buoyancy pockets connected to an individual inflation source is juxtaposed to a second adjacent buoyancy pocket which is not itself connected to its own individual inflation source, the boom assembly further including means forming a connector conduit joining each first buoyancy pocket to its adjacent second buoyancy pocket, whereby compressed gas from each inflation source fills and rigidifies two adjacent buoyancy pockets.

3. The boom assembly defined in claim 2, wherein the upper portion of each buoyancy segment of the fin is flanked by the first and the second adjacent buoyancy pockets connected for inflation by the same inflation source.

4. The boom assembly defined in claim 3, wherein the connector conduit passes through juxtaposed wall regions of said flanking pockets and through an aligned aperture in the fin.

5. The boom assembly defined in claim 1, wherein the buoyancy pockets form a buoyant float portion extending along the upper edge of each buoyancy segment and have a round-edged cylindrical shape.

6. The boom assembly defined in claim 1, wherein the spaces between the facing ends of said pockets are spanned by inter-float segments of said reinforcing cable shorter in length than the adjacent inter-float segments of the fin, whereby arched buckled inter-float fin segments are produced facilitating flexural bending of the boom assembly at each inter-float fin segment.

7. The boom assembly defined in claim 1, wherein each inflation source comprises a pressurized gas container connected to an interior cavity of a buoyance pocket by way of a valve having a movable actuator connected by a link to an anchor point longitudinally spaced along the fin beyond one flexible inter-float segment thereof, whereby the movable actuator may be connected in an armed condition to the link when the boom assembly is accordion folded at said inter-float fin segment, and whereby unfolding of said inter-float fin segment lengthens the dstance between the valve and the anchor point, causing the link to move the actuator to a valve-open condition.

8. A floating boom storage and deployment apparatus incorporating the boom assembly defined in claim 1, wherein the inflation sources comprise flexible, rupturable, dual compartment containers connected to the cavity of each inflatable pocket and enclosing separate bodies of chemical reactants isolated by a rupturable partition wall, and wherein the actuating means comprise pinch rolls positioned for rolling interengagement with the boom assembly passing therebetween and resiliently biased toward each other to apply compressive force to the flexible container causing rupture of its partition and mixing of the chemical reactants producing the release of gaseous reaction products whose generated pressures ruptures the reactant container and inflates the connected buoyancy pocket.

9. The boom storage and deployment apparatus defined in claim 8, wherein each rupturable flexible container is positioned inside a collapsible inflatable pocket of the boom assembly.

References Cited

UNITED STATES PATENTS 3,119,132  1/1964  Nayar _____ 9—319
3,494,132  2/1970  Logan _____ 61—1

JACOB SHAPIRO, Primary Examiner

U.S. Cl. X.R.

9—319